United States Patent Office 2,704,924
Patented Mar. 29, 1955

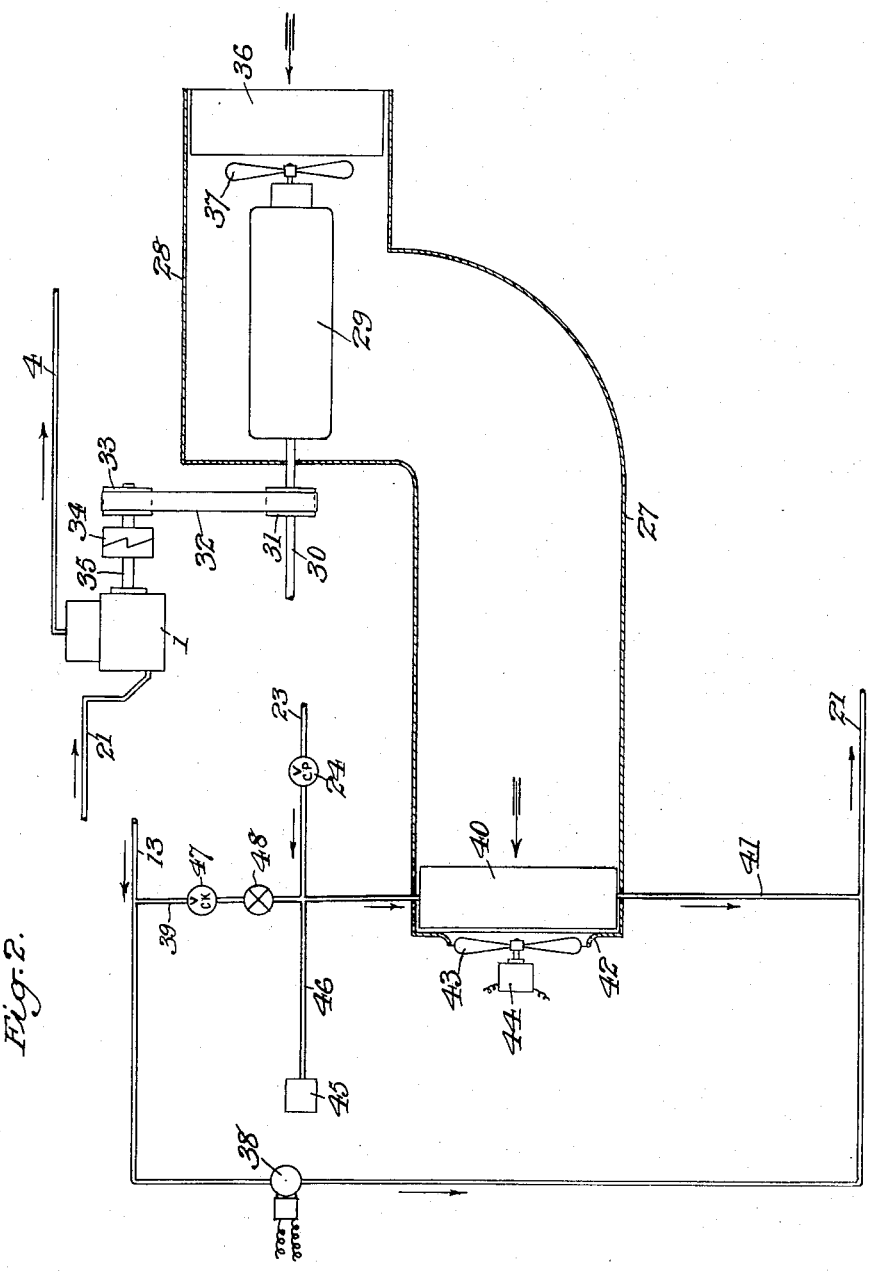

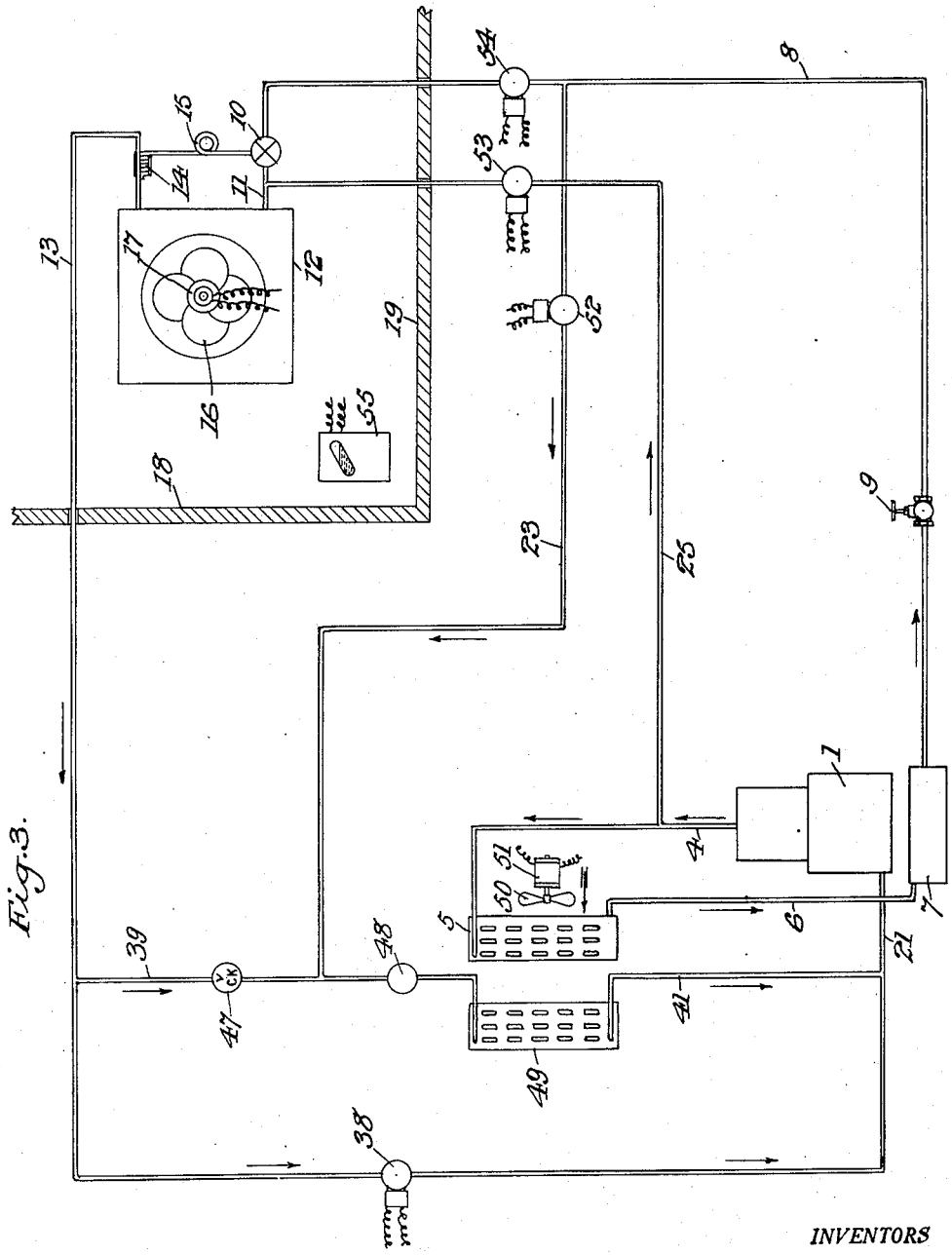

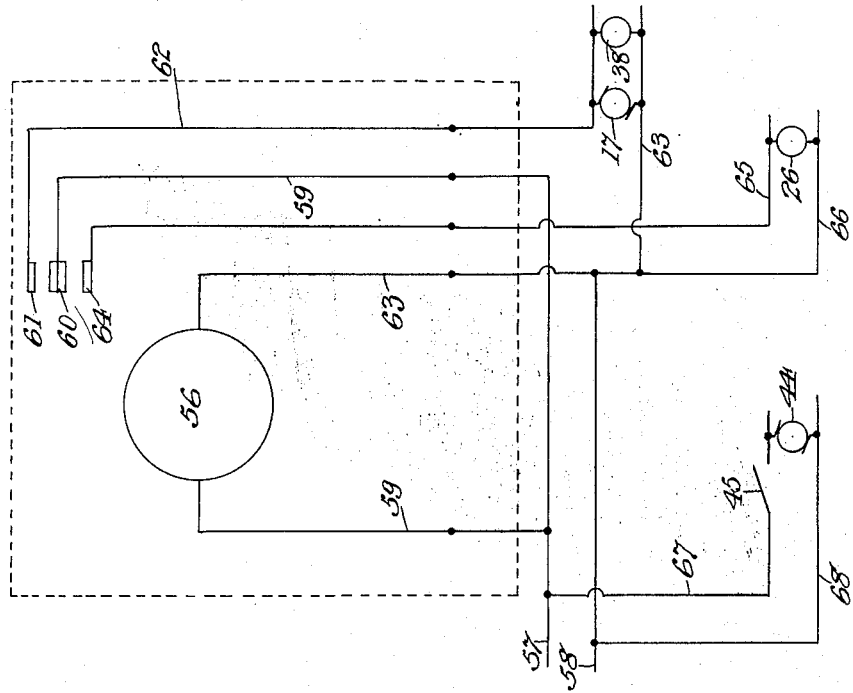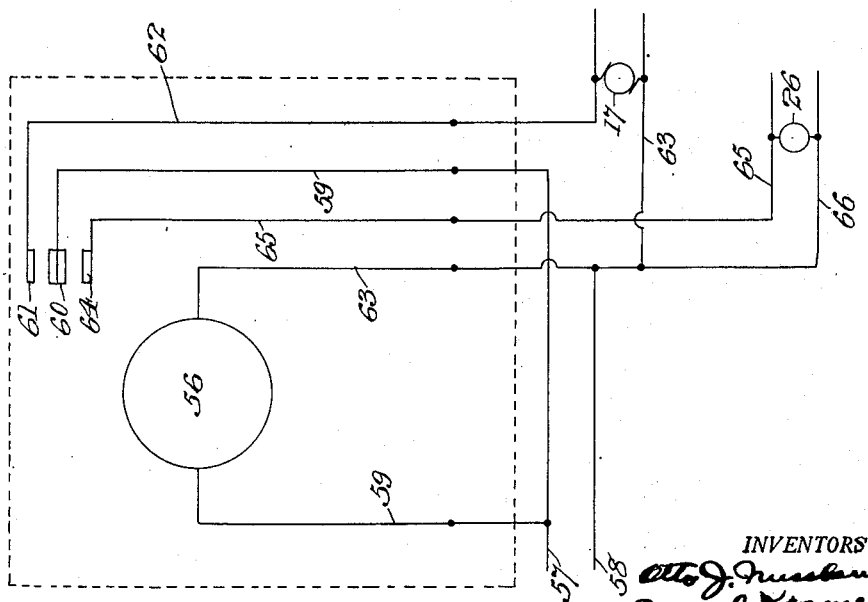

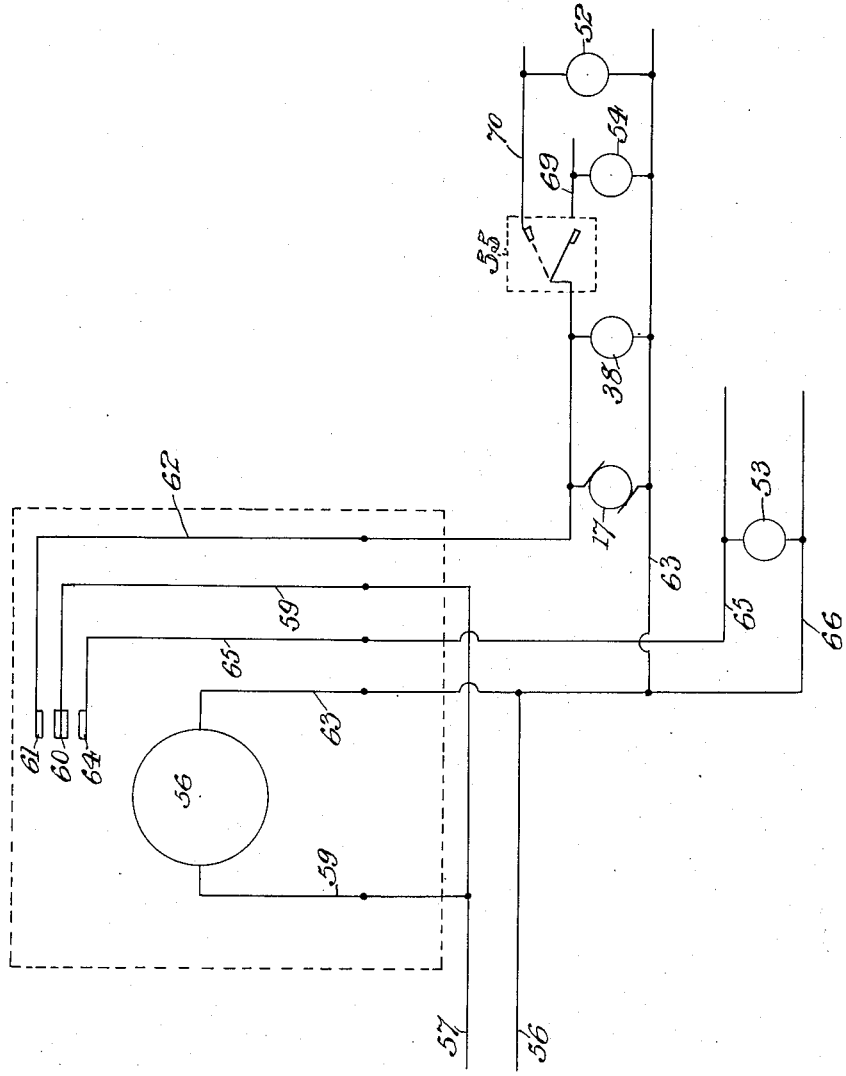

2,704,924

REFRIGERATING SYSTEM PROVIDED WITH COMBINED LOAD BALANCING AND RE-EVAPORATING MEANS

Otto J. Nussbaum and Israel Kramer, Trenton, N. J.; said Nussbaum assignor to Kramer Trenton Company, Trenton, N. J., a corporation of New Jersey Application August 15, 1951, Serial No. 241,948

19 Claims. (Cl. 62—3)

This invention relates to heat exchange apparatus and, more particularly, to refrigerating systems, and it has for an object to provide such an apparatus or system embodying means which is preferably automatic for balancing the refrigerant pressure and heat load in the system in such a way as to compensate for varying conditions in the evaporator due, for instance, to changes in the heat load at the evaporator or in the revolution speed of the compressor; together with means for reevaporating prior to its entry into the suction side of the compressor the liquid refrigerant returning to the compressor from the evaporator or passing from the evaporator feed line to the compressor suction line during the balancing operation of the system.

Another object is to provide such an apparatus or system which is suitable for general use in various kinds of installations and in various temperatures, and is excellently adapted for installation on an engine driven vehicle, such as a truck, and for operation whether the truck be moving or at a standstill.

Another object is to provide such an apparatus or system which includes a unit that serves the double purpose of a balancer and reevaporator.

Another object is to provide such an apparatus or system in which the balancing and reevaporating unit is adapted to utilize heat drawn from sources outside the system, such, for instance, as circumambient air, and/or to utilize heat from sources within the system, such, for instance, as air flowing from the condenser or air flowing from the engine chamber and engine radiator of the truck or other vehicle in which the system is installed.

Another object is to provide such an apparatus or system in which the combined balancer and reevaporator assists in maintaining a sufficient amount of heat within the system so as to insure rapid defrosting of the evaporator and thus avoid disadvantageous temperature rises within the refrigerating space during the defrosting periods.

Another object consists in providing such an apparatus or system in which the combined balancer and reevaporator is positioned in a conduit connected at two points with the suction line leading from the evaporator to the compressor, whereby, with a suitable valve arrangement, the refrigerant flowing from evaporator to compressor may be caused to enter the compressor with or without passing through the balancer and reevaporator.

A further object consists in providing certain improvements in the form, construction and arrangement of the parts whereby the above named objects, and others inherent in the invention, may be efficiently attained.

Practical embodiments of the invention are represented in the accompanying drawings in which:

Fig. 2 represents a similar view of a modified form of the invention, showing the truck engine drive and a pressure switch controlled fan for the combined balancer and reevaporator, which latter is positioned in a conduit that is connected at two points to the compressor suction line;

Fig. 3 represents a diagrammatic layout of a second modified form of the invention in which the combined balancer and reevaporator is positioned as in Fig. 2, and in which the condenser is associated with the combined balancer and reevaporator so that warm air will be supplied to the latter by the condenser fan;

Fig. 4 represents a wiring diagram of the electric controlling means for the form of the invention shown in Fig. 1;

Fig. 5 represents a wiring diagram of the electric controlling means for the form of the invention shown in Fig. 2; and Fig. 6 represents a wiring diagram of the electric controlling means for the form of the invention shown in Fig. 3.

Figure 1:
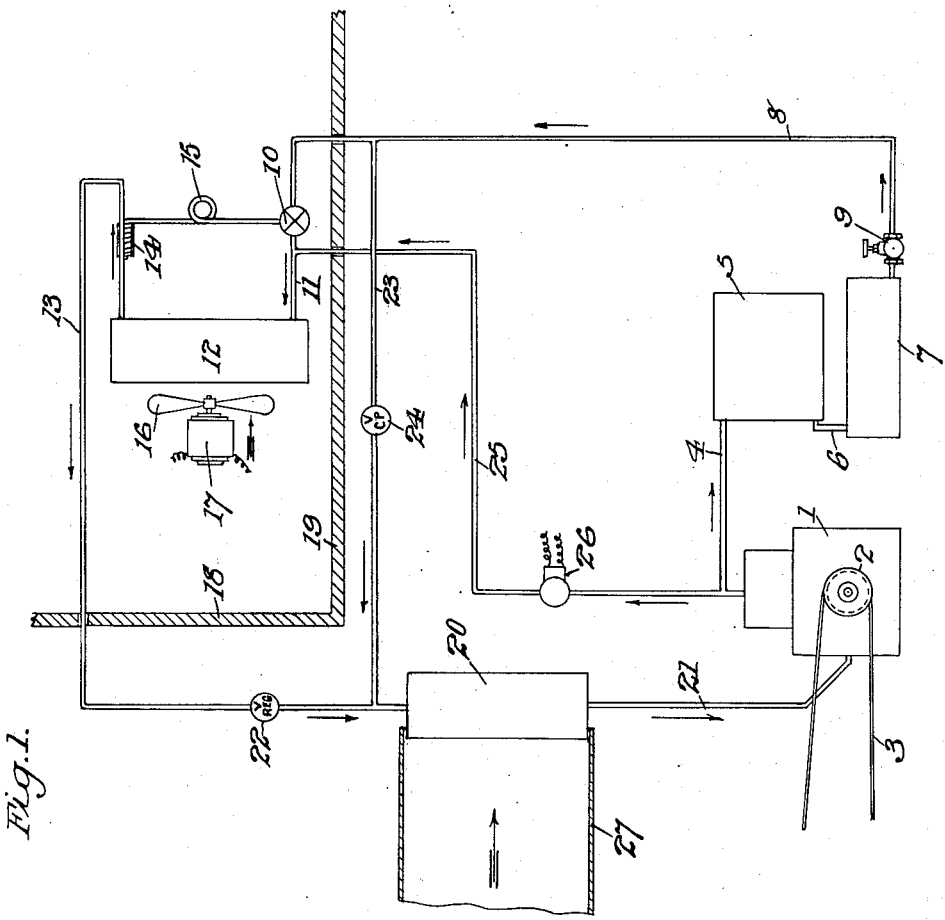
Fig. 1 represents a diagrammatic layout of the apparatus or system arranged for installation on an engine driven truck with warm air supplied from the engine chamber to the combined balancer and reevaporator.

In refrigerating systems it is highly to be desired to attain and maintain a predetermined pressure and temperature for a given heat load at the evaporator, with proper balance between the high side and low side of the system; to provide for rapid and efficient defrosting of the evaporator by hot gas flowing from the discharge of the compressor; and to insure reevaporation of liquid refrigerant flowing to the suction intake of the compressor in order to avoid injuring the compressor or handicapping its functioning and also to insure an adequate supply of heat in the system for satisfactory intermittent defrosting. The present invention is calculated to achieve these desiderata efficiently, economically and without resort to complicated structures.

Referring to the form of the invention shown in Fig. 1, the compressor is denoted generally by 1 and it may be driven through its pulley 2 by a belt 3 extending from any suitable source of power, such, for instance, as the truck engine shown in Fig. 2 or an electric motor, not shown. The compressor may be of any well known and approved form and it will not be further described in view of the fact that its particular construction constitutes no part of the present invention.

The discharge of the compressor is connected by a conduit 4 with a condenser 5 that is, in turn, connected by a pipe 6 with a receiver 7, the said condenser and receiver being of any approved form and calling for no further description herein. The outlet of the receiver communicates by a refrigerant supply conduit 8, having a service valve 9, with a pressure reducing device, such as a thermostatic expansion valve 10, from which valve a conduit 11 leads to an evaporator 12, which may be of any approved form. The outlet of the evaporator is in communication with a suction conduit 13 leading to the intake of compressor 1, as will be hereinafter described; and the expansion valve 10 is controlled, as usual, by a feeler bulb 14, which is clamped to the suction conduit 13 and communicates with the valve through a capillary tube 15. If desired, the expansion valve 10 may also have associated with it a modulating control for regulating the flow of refrigerant, which is a device well known to those familiar with this industry, obtainable in the open market, and not deemed to require illustration or description. The usual fan 16 and fan motor 17 may be associated with evaporator 12, and the said assembly is suitably positioned in a refrigeration chamber which may be in a fixed position or on a vehicle and may also be either closed, or open as in a self service ice display case, two walls of which chamber are denoted by 18, 19.

The suction line 13 leads from evaporator 12 to a second evaporator 20, located outside the chamber 18, 19, which said evaporator 20 may also be of any well known form; and the outlet of evaporator 20 is connected by a conduit 21 with the suction intake of compressor 1. A suction pressure regulating valve 22 is positioned in conduit 13 intermediate the two evaporators, the construction and functioning of which are well known to operators in this field.

A by-pass conduit 23 connects the supply conduit 8 with the suction conduit 13, the point of connection with conduit 8 being intermediate receiver 7 and expansion valve 10, while the point of connection with suction conduit 13 is intermediate evaporator 20 and pressure regulating valve 22. In conduit 23 is located a regulating valve 24, which is preferably an expansion valve of the type adapted to maintain a predetermined outlet pressure and which can be regulated by adjustment of its mechanism so that it will open only when the pressure at its outlet falls below that to which it is adjusted. Such a valve is known as a constant pressure automatic expansion valve and its construction and mode of operation so well known to those in this field as to call for no further description or illustration herein.

The discharge of the compressor 1 is connected by a defrosting conduit 25 with conduit 11 at a point intermediate expansion valve 10 and evaporator 12, and a valve, such as a solenoid valve 26, is positioned in conduit 25 so that the said conduit may be opened for flow of hot refrigerant to the evaporator 12 during defrosting periods and closed against the flow of refrigerant during normal operation of the refrigerating system.

If desired, a duct 27 may be associated with evaporator 20 for leading warm air thereto from any available source, such, for instance, as from the engine enclosure and/or radiator of a motor driven truck, as is illustrated, for instance, in the form of this invention shown in Fig. 2, to be hereinafter described. And, indeed, it is possible to omit valve 22 when sufficiently warm air is at all times available for evaporator 20.

In the normal operation of the form of this invention illustrated in Fig. 1, the solenoid valve 26 is closed and the fan 16 is driven by its motor 17, the said valve and motor being controlled by the electric system illustrated in Fig. 4, as will be hereinafter set forth. The hot gas from compressor discharge passes through conduit 4, condenser 5, receiver 7 and supply line 8 to expansion valve 10, which it reaches in the form of liquid refrigerant, the pressure of which is reduced by the said valve and the refrigerant introduced therefrom into evaporator 12 for chilling the chamber 18, 19, all as is well understood by those familiar with the refrigeration industry. From the evaporator 12 the refrigerant, which has been vaporized in the evaporator, flows through suction line 13, valve 22, evaporator 20, and conduit 21 to the suction intake of the compressor, for compression and recirculation through the system as just described. Intermittent defrosting of the evaporator 12 is, of course, required and the defrosting periods may be automatically initiated by well known means, such as the electric timer shown in Fig. 4 which, through suitable connections as will be hereinafter detailed, opens the solenoid valve 26, in the defrosting line 25, and shuts off fan motor 17. The hot gas from compressor discharge will now flow through conduit 25 and enter evaporator 12, wherein its heat will melt the encrustation of frost on the evaporator. At the same time the chilling effect of the said frost will liquefy the refrigerant gas passing through the evaporator so that the latter will enter and flow through suction line 13 in the form of a liquid. However, when this liquid refrigerant reaches evaporator 20, it will be vaporized by its passage therethrough and will flow from the outlet of said evaporator 20, which now serves as a reevaporator, through conduit 21 into the suction intake of the compressor in the form of gas. During this stage of the operation of the system the suction pressure regulating valve 22 will partly close or throttle down from its normal fully opened position and in effect become a pressure reducing expansion valve for the reevaporator 20, thereby facilitating the heat transfer function of the said reevaporator by enabling it to absorb heat from the circumambient air even though the latter may be at a temperature as low as zero degrees Fahrenheit. This reevaporation will be materially aided by warm air drawn through the duct 27 leading from the engine enclosure of the vehicle and, indeed, the reevaporator 20 could, if desired, be placed within the engine enclosure, thus eliminating the necessity of providing a duct for leading warm air from the said enclosure to the reevaporator. While the provision of a warm air supply for the reevaporator enhances its functional effect, it should be emphasized that this system is so designed as to be capable of operating without any such supply of warm air, due to the ability of the reevaporator to pick up or absorb heat from the surrounding atmosphere or circumambient air even though the latter be at a low temperature degree.

Referring to the matter of balance in the system, there will be a tendency to upset the balance as, for instance, by reduction in the heat load in the refrigeration chamber and/or by increase in refrigerating capacity due to higher rotation speed of compressor operation which may arise from acceleration in the speed of the truck if the system is mounted in such a vehicle; but this tendency to upset balance will at once be reflected by a lowered suction pressure in conduit 13 which will affect conduit 23 at the outlet of valve 24 and cause the latter to open since it will have previously been set to open at a predetermined pressure at the outlet side of valve 24. Its opening will permit liquid refrigerant to cross from supply conduit 8 into suction conduit 13 without passing through the evaporator 12, thereby raising the pressure in the suction line and balancing the high side and low side of the system. This liquid refrigerant thus transferred from supply conduit 8 to suction conduit 13 will be reevaporated in reevaporator 20 before its passage through conduit 21 to the suction intake of compressor 1, and thus the said reevaporator 20 acts as a load balancer by evaporating or using up the excess of the refrigerant liquid in supply conduit 8 which the evaporator 12, under the conditions specified, is unable to handle as in the normal refrigerating cycle. From the foregoing it will be apparent that the reevaporator 20 serves functionally as a combined load balancer and reevaporator through its capability of handling excess supply of liquid refrigerant arising from decreased heat load upon the evaporator 12 and/or increased functional effect of the compressor 1, together with its capability of reevaporating liquid refrigerant which has been condensed in evaporator 12 during defrosting periods and is returning therefrom to the suction intake of the compressor.

Turning now to the modified form of the invention represented in Fig. 2, the compressor is again denoted by 1, its discharge conduit by 4 and its intake conduit, which is an extension of suction line 13, by 21, all as in the form represented in Fig. 1. The engine housing of a truck, or other motor driven vehicle, is marked 28 and it communicates with a warm air duct which is indicated by 27 in order to conform with the reference numeral on the corresponding part in Fig. 1, and which could be of smaller diameter if desired. Within the enclosure 28 is mounted the truck engine 29, the crank shaft 30 of which has a belt pulley 31 fixed thereon for driving a belt 32 that embraces another pulley 33 fixed to one member of a clutch 34, the other member of which is fixed on compressor shaft 35. The clutch is shown diagrammatically but it will be understood it may be of any suitable form and be connected with the usual mechanism for engaging and disengaging it to bring the compressor 1 into and out of driving cooperation with engine 29. The engine radiator is marked 36 and has associated therewith the usual fan 37 for assisting in the circulation of air therethrough.

The suction conduit 13 is fitted with a solenoid valve 38 and a cut-off conduit 39 leads from a point in conduit 13 intermediate the refrigerating evaporator 12 (not shown in Fig. 2) and valve 38 to the reevaporator, here marked 40, from which latter a continuation of cut-off conduit 39, marked 41, leads to another point in suction line or conduit 13, which is intermediate valve 38 and compressor 1. It will thus be seen that, when valve 38 is open, refrigerant flowing from the refrigerating evaporator 12 may pass to the compressor without traversing the reevaporator; whereas the closing of valve 38 will force the refrigerant to follow a course through reevaporator 40 before entering the suction inlet of the compressor.

Reevaporator 40 is positioned within the outer end of duct 27 and the said end of the duct may be provided with an annular flange 42 that provides an opening therewithin for operation of a suction fan 43 which may be desirable under some circumstances and is driven by an electric motor 44, which motor, as well as solenoid valve 38, is governed by the electric control shown in Fig. 5, to be hereinafter described, as well as by pressure switch 45 which is connected to conduit 39 by a tube 46. Conduit 23 communicates with cut-off conduit 39, and a check valve 47 is positioned in conduit 39 intermediate conduit 23 and suction conduit 13 to prevent the flow of liquid refrigerant through conduit 39 into suction conduit 13 during the load and pressure balancing periods when constant pressure valve 24, described above, in conduit 23 is open. A pressure reducing valve 48, which is preferably adjustable so as to maintain a fixed maximum pressure at its outlet, is located intermediate the outlet of evaporator 12 and the junction point of conduits 23 and 39, a convenient position being in conduit 39 as shown in the drawing. Pressure switch 45 is designed to close when a rise in pressure occurs at the inlet to reevaporator 40. The pressure at this point will be equal to the pressure in suction conduit 13 when there is no flow of refrigerant through the reevaporator, but when there is flow of refrigerant through the reevaporator, as takes place during both the defrosting and load balancing periods, the pressure at the inlet to reevaporator 40 will rise and cause swich 45 to close and start fan motor 44. It may be noted that the pressure switch 45 could be arranged to act as a double throw switch that would close solenoid valve 38 when fan motor 44 is started and that, with such an arrangement, check valve 47 could be omitted.

In the normal operation of this form of the invention shown in Fig. 2, the refrigerant from the discharge of compressor 1 is supplied through condenser, receiver and expansion valve to evaporator 12 as described in connection with Fig. 1 and the evaporated refrigerant flows through conduits 13 and 21 back to the suction inlet of the compressor, passing through solenoid valve 38, which is open. During defrosting periods, valve 38 is closed and valve 26 is opened by the electric control and the refrigerant flowing from evaporator 12, which is then in liquid form, passes through cut-off conduit 39, reevaporator 40 and conduits 41 and 21 before entering the suction side of the compressor, during which travel of the refrigerant it is revaporized so as to enter the compressor in gaseous form. The hot air from the engine enclosure 28 is forced through reevaporator 40 by the motion of the vehicle, by the radiator fan 37, and also, when its effect is desirable, by reevaporator suction fan 43, thus rendering the functioning of the reevaporator extremely efficient; and the pressure reducing valve 48 also serves to assist this functioning by reducing the pressure of the liquid refrigerant before it enters the reevaporator. Under certain conditions the valve 48 may be omitted as hereinabove noted in connection with valve 22. During load balancing periods, when the constant pressure valve 24 in conduit 23 is open, the liquid refrigerant flows through the part of cut-off conduit 39 that is between conduit 23 and reevaporator 40, thence through the reevaporator and conduits 41 and 21 so as to enter the compressor in gaseous form, and the functioning of reevaporator 40 is, under these conditions, that of a load balancer. Check valve 47, as previously indicated, inhibits the flow of the liquid refrigerant from conduit 23 into conduit 13.

Referring to the second modified form of the invention which is illustrated in Fig. 3, the parts which have been described in connection with Figs. 1 and 2 and which are repeated in Fig. 3 are given the same reference numerals as hereinabove, even though the diagrammatic layout of Fig. 3 differs somewhat from the layouts of Figs. 1 and 2. Thus the compressor is denoted by 1, its discharge conduit by 4, the condenser by 5, the pipe leading therefrom to the receiver by 6, the receiver by 7, the refrigerant supply conduit by 8, its service valve by 9, the supply line expansion valve by 10, the conduit leading therefrom to the evaporator by 11, the evaporator by 12, the suction conduit or line leading therefrom by 13, the feeler bulb by 14, its capillary tube leading to the expansion valve by 15, the evaporator fan by 16, its motor by 17, and refrigeration chamber walls by 18, 19.

As the reevaporator is arranged somewhat differently in Fig. 3, as compared with its arrangements in Figs. 1 and 2, it is given a new reference number 49. It is positioned so as to have its inlet and outlet connected respectively with the portions 39 and 41 of the cut-off conduit connecting points of the suction line 13, as described in connection with the form of the invention shown in Fig. 2, and the check valve 47 is positioned in conduit 39 for the purpose described in connection with Fig. 2. In this form of Fig. 3, the condenser 5 is associated in juxtaposition with relation to reevaporator 49, and may be integral with it, while the usual condenser fan 50 and its motor 51 are located so that air driven by the fan through the condenser, which is warmed by its passage therethrough, will impinge upon and traverse reevaporator 49 in order to increase the functional effect of the latter as hereinabove described with reference to the warm air passing through duct 27, in Figs. 1 and 2.

Conduit 23 is provided, in the form of Fig. 3, with a solenoid valve 52, in place of the constant pressure valve 24 of Fig. 1. The defrosting conduit 25 is likewise fitted with a solenoid valve 53, and the supply conduit 8 with a solenoid valve 54, while the solenoid valve 38 described in connection with Fig. 2 is similarly located in the suction line 13 of Fig. 3.

A double throw thermostat switch 55 is placed within the refrigeration chamber 18, 19, and is in electrical connection with solenoid valve 52, as will be hereinafter described when referring to Fig. 6, for the purpose of controlling the initiation and termination of the load balancing operation by opening and closing conduit 23; so that, in effect, the combination of valve 52 and thermostat 55 accomplishes the function of constant pressure valve 24.

In the normal operation of this second modified form of the invention represented in Fig. 3, the refrigerant takes the usual course from the discharge of compressor through condenser, receiver, expansion valve, evaporator and suction line back to the inlet of the compressor, flowing through solenoid valves 54 and 38, which are open during normal operation. During defrosting periods, solenoid valve 38 is closed and solenoid valve 53 is opened, and the refrigerant flowing from the evaporator 12, which has been liquefied therein, travels through conduit 39, reevaporator 49 and conduits 41 and 21, so that it reaches the inlet of the compressor in the form of gas due to its vaporization in the reevaporator. In these defrosting periods, the reevaporator 49 draws its heat almost entirely from the circumambient air, because the condenser 5 is practically passive owing to the fact that nearly all the refrigerant from the compressor discharge flows through defrosting conduit 25 because the pressure in evaporator 12 is less than the pressure in condenser 5. Load balancing periods are controlled by the thermostat switch 55 within the refrigeration chamber 18, 19, which opens valve 52 and closes valve 54 when the temperature drops within the chamber, due, for instance, to reduction in the heat load therewithin and/or excess of refrigerant supply from the compressor, and activates the thermostat. In these periods liquid refrigerant will flow from supply conduit 8 through conduit 23, conduit 39, pressure reducing valve 48, to reevaporator 49, wherein the refrigerant will be vaporized and will then flow as a gas through conduits 41 and 21 to the inlet of the compressor. The vaporization of the refrigerant in reevaporator 49 during these periods will be assisted by the warm air driven by condenser fan 50 through condenser 5 and reevaporator 49, because the condenser remains active while the load balancing operation proceeds. When this operation has raised the temperature within the refrigeration chamber 18, 19, sufficiently, thermostat 55 will be activated in the opposite direction and will close valve 52 and open valve 54, thereby terminating the balancing period. If preferred, valve 52 could be a modulating valve and thermostat 55 a modulating thermostat, the two being connected so that the extent to which valve 52 opens would depend upon the degree of temperature change affecting the thermostat.

The wiring diagram of the electrical control for the form of the invention shown in Fig. 1 is illustrated in Fig. 4, wherein an electric timer is denoted by 56, and is preferably of the self starting type, various forms of which are well known and on the market, so as to require no further description or illustration herein. Electric current is fed to the timer from a suitable source of supply (not shown), through wires 57 and 58, and one terminal of the timer 56 is connected by a wire 59 with the moveable arm 60 of the timer switch. The on terminal 61 of the said switch is connected by wire 62 with one terminal of evaporator fan motor 17, the other terminal of which is connected by a wire 63 with the second terminal of the electric timer 56. The off terminal 64 of the timer switch is connected by a wire 65 with one terminal of solenoid valve 26, and the other terminal of said valve is connected by a wire 66 with wire 63 that leads to the timer 56. It will thus be seen that, when the timer opens solenoid valve 26, for a defrosting period, it deenergizes evaporator fan motor 17 so as to stop the latter; while a contrary condition is established upon termination of the defrosting period.

Fig. 5 shows the wiring diagram for the form of the invention illustrated in Fig. 2, and parts which are the same as those shown in Fig. 4 are correspondingly numbered. The solenoid valve 26 in the hot gas defrost line 25 of Fig. 1 is omitted in Fig. 2, as is the defrost line itself, but the said valve is shown in Fig. 5 because it is included in the electrical control and it is given the same number as in Figs. 1 and 4, the wires leading thereto being numbered 65 and 66, as in Fig. 4. The switch 45 that controls the fan motor 44 of Fig. 2 is connected by a wire 67 with wire 57 and is arranged to make and break contact with one terminal of the motor 44, while the other terminal thereof is connected by a wire 68 with wire 58. Wires 62 and 63 which respectively connect the on terminal 61 and off terminal 64 of the timer switch with the evaporator fan motor 17, that is shown in Fig. 4 but omitted from Fig. 2, are extended for connection with the terminals of solenoid valve 38 which is in suction line 13. As the operation of the form of the invention represented in Fig. 2 has been hereinabove described, there seems no occasion for repeating the same in connection with Fig. 5.

Turning now to Fig. 6, which exhibits the wiring diagram for the form of the invention shown in Fig. 3, the parts which correspond to those hereinabove numbered have the same reference numerals applied thereto. The solenoid valve marked 53 in Fig. 6 takes the place of the valve 26 shown in Figs. 4 and 5, although both are in the hot gas defrost line, because there is this difference in numbering between the showings of Fig. 1 and Fig. 3, but the solenoid valve 38 in the suction line retains its same number in Fig. 6. The additional solenoid valves 52 and 54 of Fig. 3 are correspondingly marked in Fig. 6 and the double throw thermostat switch 55 of Fig. 3 is given the same number in Fig. 6. It will be observed that wires 62 and 63 lead not only to the terminals of the motor 17 and valve 38 as in Fig. 5 but that wire 62 also leads to the hinge or pivot of thermostat switch 55, and wire 63 leads to one terminal of valve 54 and one terminal of valve 52. A wire 69 connects one terminal of switch 55 with the second terminal of valve 54, and a wire 70 connects the other terminal of switch 55 with the second terminal of valve 52. As remarked in connection with the description of Fig. 5, it is believed that no further explanation is called for in connection with Fig. 6 because the operation of the form of the invention shown in Fig. 3 to which the wiring diagram of Fig. 6 is directed has previously been set forth. It may, however, be noted that motor 51 of condenser fan 50 shown in Fig. 3 is not included in the wiring diagram of Fig. 6 because it is wired in parallel connection with the motor that drives compressor 1 and operates fan 50 continuously whenever the compressor is in operation. If desired, a manual switch could be used in place of timer 56.

On Figs. 1, 2 and 3, arrows indicate direction of flow of refrigerant and air.

Referring to all three forms of the invention shown in Figs. 1, 2 and 3, it should be observed that when conditions such, for instance, as extremely low temperature, call for the supplying of some heat to the refrigeration chamber, this may be readily accomplished by an operation similar to the defrosting step except that the supply of hot gas from the compressor to the evaporator is not initiated by the timer which controls the solenoid valve in the defrosting conduit, but is initiated, for instance, by a manual switch or a thermostatic switch of any suitable kind which may be electrically connected in parallel with the timer switch. Furthermore, a gravity type evaporator may be substituted for the evaporator herein shown and described, if desired.

As the operation has been described in connection with the description of each form of the invention shown in the drawings, it is deemed unnecessary to repeat the same in a general way; but it will be understood that the utility of the apparatus or system is not limited to vehicle installation as it may have a stationary base; and also that various changes may be resorted to in the form, construction and arrangement of the several parts without departing from the spirit and scope of the invention, so that we do not intend to be limited to details herein shown or described except as they may be included in the claims or be required by disclosures of prior art.

What we claim is:

1. A refrigerating system comprising, a compressor, an evaporator, a liquid refrigerant supply line connecting the discharge of the compressor with the inlet of the evaporator, a refrigerant suction line connecting the outlet of the evaporator with the inlet of the compressor, a conduit interconnecting the said supply and suction lines for the flow of liquid refrigerant from the former to the latter during refrigerating cycles to maintain proper pressure balance between the high and low sides of the system, a defrosting conduit for the flow of warm refrigerant connecting the discharge of the compressor with the evaporator, and a combined load balancer and reevaporator positioned in the said suction line between the said interconnecting conduit and the compressor inlet.

2. A refrigerating system as defined in claim 1, which also includes valve means subject to conditions in the evaporator for opening and closing the interconnecting conduit.

3. A refrigerating system as defined in claim 2, which also includes valve means for opening and closing the defrosting conduit.

4. A refrigerating system as defined in claim 3, in which the valve means for opening and closing the interconnecting conduit is controlled by temperature at the evaporator, and in which the valve means for opening and closing the defrosting conduit is controlled by predetermined setting.

5. A refrigerating system as defined in claim 1, in which the combined load balancer and reevaporator is exposed to circumambient air.

6. A refrigerating system as defined in claim 1, which also includes means for supplying warm air to the combined load balancer and reevaporator.

7. A refrigerating system as defined in claim 6, in which the combined load balancer and reevaporator is also exposed to circumambient air.

8. A refrigerating system as defined in claim 1, which also includes pressure regulating means positioned in the suction line intermediate the evaporator and the combined load balancer and reevaporator.

9. A refrigerating system as defined in claim 1, which also includes an internal combustion engine for driving the compressor, and means for supplying warm air from the said engine to the combined load balancer and reevaporator.

10. A refrigerating system as defined in claim 1, which also includes a condenser positioned in the supply line, and means for supplying warm air from the said condenser to the combined load balancer and reevaporator.

11. A refrigerating system comprising, a compressor, an evaporator, a liquid refrigerant supply line connecting the discharge of the compressor with the inlet of the evaporator, a refrigerant suction line connecting the outlet of the evaporator with the inlet of the compressor, a cut-off line connecting with the suction line at two points between the evaporator and the compressor, a conduit interconnecting the said supply and cut-off lines for the flow of liquid refrigerant from the former to the latter during refrigerating cycles to maintain proper pressure balance between the high and low sides of the system, and a combined load balancer and reevaporator positioned in the said cut-off line between the said interconnecting conduit and the compressor inlet.

12. A refrigerating system as defined in claim 11, which also includes a valve positioned in the suction line and between the points at which the cut-off line connects therewith.

13. A refrigerating system as defined in claim 12, which also includes a valve positioned in the cut-off line between the suction line and the interconnecting conduit operative to prevent flow of refrigerant from the latter to the former without passing through the combined load balancer and reevaporator.

14. A refrigerating system as defined in claim 13, which also includes a pressure regulating valve positioned in the cut-off line between the interconnecting conduit and the combined load balancer and reevaporator.

15. A refrigerating system as defined in claim 14, which also includes a fan for the combined load balancer and reevaporator, and a pressure switch connected with the cut-off line for controlling the operation of the said fan.

16. A refrigerating system comprising, a compressor, a refrigeration chamber, an evaporator located within said chamber, a liquid refrigerant supply line connecting the discharge of the compressor with the inlet of the evaporator, a refrigerant suction line connecting the outlet of the evaporator with the inlet of the compressor, a cut-off line connecting with the suction line at two points between the evaporator and the compressor, a conduit interconnecting the said supply and cut-off lines for the flow of liquid refrigerant from the former to the latter during refrigerating cycles to maintain proper pressure balance between the high and low sides of the system, a combined load balancer and reevaporator positioned in the said cut-off line between the said interconnecting conduit and the compressor inlet, a valve positioned in the suction line between the points at which the cut-off line connects therewith, a valve in the supply line between the said interconnecting conduit and the evaporator, a valve in said interconnecting conduit subject to conditions in the refrigeration chamber, and electric means for operating said valves.

17. A refrigerating system as defined in claim 16, which also includes an automatic device positioned in the refrigeration chamber and cooperative with the electric means for controlling the valves in the supply line and in the said interconnecting conduit.

18. A refrigerating system as defined in claim 17, in which the automatic device positioned within the refrigeration chamber is a thermostat.

19. A refrigerating system as defined in claim 16, which also includes a defrosting conduit for the flow of warm refrigerant connecting the discharge of the compressor with the evaporator, and a valve in said defrosting conduit operable by said electric means.

References Cited in the file of this patent

UNITED STATES PATENTS

| | | |
|---|---|---|
| 2,281,770 | Hoesel | May 5, 1942 |
| 2,286,961 | Hanson | June 16, 1942 |
| 2,384,210 | Sunday | Sept. 4, 1945 |
| 2,417,582 | Barfield | Mar. 18, 1947 |
| 2,430,960 | Soling | Nov. 18, 1947 |
| 2,440,146 | Kramer | Apr. 20, 1948 |
| 2,481,469 | Brown | Sept. 6, 1949 |
| 2,523,451 | Schulz | Sept. 26, 1950 |
| 2,526,379 | Masseritz | Oct. 17, 1950 |
| 2,530,440 | Nussbaum | Nov. 21, 1950 |
| 2,540,550 | Schulz | Feb. 6, 1951 |
| 2,564,310 | Nussbaum | Aug. 14, 1951 |
| 2,608,067 | Alexander | Aug. 26, 1952 |
| 2,632,303 | Smith | Mar. 24, 1953 |

FOREIGN PATENTS

| | | |
|---|---|---|
| 639,313 | Great Britain | June 28, 1950 |